United States Patent
Halsey (10) Patent No.: US 11,014,748 B1
(45) Date of Patent: May 25, 2021

(54) DIVERTER APPARATUS AND METHOD OF USING THE SAME

(71) Applicant: INTELLIGRATED HEADQUARTERS, LLC, Mason, OH (US)

(72) Inventor: James Wayne Halsey, Cincinnati, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/791,307

(22) Filed: Feb. 14, 2020

(51) Int. Cl.
*B65G 13/10* (2006.01)
*B65G 13/12* (2006.01)
*B65G 13/02* (2006.01)
*B65G 47/64* (2006.01)

(52) U.S. Cl.
CPC ............. *B65G 13/10* (2013.01); *B65G 13/02* (2013.01); *B65G 13/12* (2013.01); *B65G 47/648* (2013.01)

(58) Field of Classification Search
CPC ........ B65G 13/10; B65G 13/12; B65G 13/02; B65G 47/644; B65G 47/648
USPC .......................................................... 198/782
See application file for complete search history.

(56) References Cited

U.S. PATENT DOCUMENTS

| | | | | |
|---|---|---|---|---|
| 3,058,565 A * | 10/1962 | Byrnes | ................... | B65G 47/54 193/36 |
| 3,983,988 A * | 10/1976 | Maxted | ................... | B65G 47/54 198/370.09 |
| 4,598,815 A * | 7/1986 | Adama | ................... | B65G 13/10 198/370.09 |
| 5,117,961 A * | 6/1992 | Nicholson | ............... | B65G 47/54 198/369.5 |
| 5,551,543 A * | 9/1996 | Mattingly | ............... | B65G 13/10 198/370.01 |
| 6,619,465 B1 * | 9/2003 | Gebhardt | ................ | B65G 13/10 193/35 MD |
| 7,040,478 B2 * | 5/2006 | Ehlert | ..................... | B65G 13/10 198/369.4 |

(Continued)

OTHER PUBLICATIONS

OCM Wheel Sorter, [online], [retrieved Mar. 3, 2020], retrieved from the Internet: URL: https://www.youtube.com/watch?v=PRS0Uj2WdpA, 1 page.

*Primary Examiner* — Mark A Deuble
(74) *Attorney, Agent, or Firm* — Alston & Bird LLP (57) ABSTRACT

Various embodiments are directed to a diverter apparatus and method of using the same. In various embodiments, the diverter apparatus is configured to selectively direct an exemplary object traveling along a conveyor travel path to one of a plurality of adjacent conveyor locations. In various embodiments, the diverter apparatus may comprise a diverter conveyor surface, a cam follower, and a cam comprising a rotational range of motion about a cam shaft axis, the cam being physically engaged with the cam follower. Various embodiments are directed to a diverter apparatus configured to utilize a plurality of forces generated by the rotational motion of the cam to facilitate the transition of the directional configuration of the diverter conveyor surface from the first directional configuration to the second directional configuration, and, subsequently, from the second directional configuration back to the first directional configuration, again using the rotational motion of the cam.

19 Claims, 8 Drawing Sheets

(56) References Cited

U.S. PATENT DOCUMENTS

| | | | |
|---|---|---|---|
| 7,581,632 B2* | 9/2009 | Wallace | B65G 13/10 |
| | | | 198/370.08 |
| 10,543,986 B1* | 1/2020 | Sines | B65G 39/18 |
| 2007/0284218 A1 | 12/2007 | Wallace et al. | |
| 2013/0126300 A1* | 5/2013 | Wolkerstorfer | B65G 13/10 |
| | | | 198/370.09 |
| 2016/0023848 A1 | 1/2016 | Fourney | |
| 2017/0121124 A1* | 5/2017 | Wilkins | B65G 13/065 |
| 2019/0135542 A1* | 5/2019 | Itoh | B65G 13/10 |

* cited by examiner

DIVERTER APPARATUS AND METHOD OF USING THE SAME

FIELD OF THE INVENTION

Various example embodiments described herein relate generally to diverter apparatuses to be used in conveyor systems. In particular, various example embodiments are directed to electronic diverter apparatuses configured to utilize cam-activated, bi-directional diverter actuation.

BACKGROUND

Industrial manufacturing and packaging applications may use conveyor systems to facilitate the transportation of objects to a desired delivery location within, for example, a factory or a warehouse. In particular, a diverter apparatus may be used within a conveyor system to divert the travel path of an object traveling along a conveyor system. Through applied effort, ingenuity, and innovation, Applicant has solved problems relating to conveyor apparatuses by developing solutions embodied in the present disclosure, which are described in detail below.

BRIEF SUMMARY

Various embodiments are directed to diverter apparatuses and methods for using the same. Various embodiments are directed to a diverter apparatus comprising: a diverter conveyor surface configured to transport an object disposed thereon to one of a plurality of adjacent conveyor locations based at least in part on a directional configuration thereof, wherein the directional configuration of the diverter conveyor surface may be configurable between at least a first directional configuration and a second directional configuration, each directional configuration corresponding to one of the plurality of adjacent conveyor locations; a cam follower; and a cam comprising a rotational range of motion about a cam shaft axis, the cam being physically engaged with the cam follower and where at least one force generated by a rotational motion of the cam causes a change of a directional configuration of the diverter conveyor.

In various embodiments, the at least one force may comprise a first force and a second force; wherein the diverter apparatus is configured to utilize the first force generated by a rotational motion of the cam to transition the directional configuration of the diverter conveyor surface from the first directional configuration to the second directional configuration; and wherein the diverter apparatus is further configured to utilize the second force generated by the rotational motion of the cam to transition the directional configuration of the diverter conveyor surface from the second directional configuration to the first directional configuration.

In various embodiments, the cam may comprise a conjugate cam. Further, in various embodiments, the conjugate cam may comprise a first cam element and a second cam element, both the first cam element and the second cam element being configured to physically engage the cam follower. In various embodiments, the at least one force comprises a first force and a second force, wherein the first cam element is configured to transmit a first force to the cam follower, and wherein the second cam element is configured to transmit a second force to the cam follower. In various embodiments, the cam follower may be configured to rotate about a cam follower axis based at least in part on the rotational motion of the cam physically engaged therewith. Further, the cam follower may be configured to rotate both a clockwise direction and a counterclockwise direction about the cam follower axis based at least in part on the rotational motion of the cam physically engaged therewith.

In various embodiments, the diverter apparatus may further comprise a plurality of wheel sets, each wheel set comprising a plurality of wheels defining at least a portion of the diverter conveyor surface; wherein a directional configuration of each of the plurality of wheel sets is independently configurable. Further, in various embodiments, the diverter apparatus may further comprise a plurality of cams respectively corresponding to the plurality wherein each of the plurality of wheel sets corresponds to one of the plurality of cams, and wherein each of the plurality of cams is configured to control the directional configuration of the wheel set corresponding thereto. Further, in carious embodiments, each of the plurality of cams may comprise a different angular configuration about a cam shaft engaged therewith.

In various embodiments, each of the plurality of wheel sets comprises a different directional configuration. In various embodiments, each of the plurality of wheel sets may comprise a wheel set base configured to support each of the plurality of wheels of the corresponding wheel set so as to restrict the linear displacement of each of the plurality of wheels of the corresponding wheel set relative to the wheel set base. Further, in various embodiments, the wheel set base may be selectively adjustable between a plurality of wheel set base positions, wherein a directional configuration of each of the plurality of wheel sets may be based at least in part on the wheel set base position of the corresponding wheel set base. In various embodiments, the diverter apparatus may further comprise a wheel set drive assembly configured to drive at least one of a plurality of plurality of wheels defining at least a portion of the diverter conveyor surface so as to facilitate the movement of the object along the diverter conveyor surface.

Various embodiments are directed to a method of selectively configuring the directional configuration of a diverter apparatus, the method comprising: generating a first reconfiguration force using a first rotational motion of a cam, the first reconfiguration force being configured to transition a conveyor surface from a first directional configuration to a second directional configuration; transitioning a conveyor surface from the first directional configuration to the second directional configuration based at least in part on the first reconfiguration force generated using the first rotational motion of the cam; generating a second reconfiguration force using a second rotational motion of the cam, the second reconfiguration force being configured to transition the conveyor surface from the second directional configuration to the first directional configuration, wherein the second rotational motion of the cam is defined by a rotation of the cam in a direction opposite to that of the first rotational motion of the cam; and transitioning the conveyor surface from the second directional configuration to the first directional configuration based at least in part on the second reconfiguration force generated using the second rotational motion of the cam.

In various embodiments, the cam may comprise a conjugate cam. In various embodiments, the conjugate cam may comprise a first cam element and a second cam element, both the first cam element and the second cam element being configured to physically engage a cam follower. Further, in various embodiments, the conveyor surface may comprise a plurality of wheel sets, each wheel set comprising a plurality of wheels defining at least a portion of the conveyor surface, wherein a directional configuration of each of the plurality of wheel sets is independently configurable. In certain embodiments, the method may further comprise selectively reconfiguring the directional configuration of a first wheel set of the plurality of wheel sets of the conveyor surface based at least in part on a determination that the first wheel set is physically engaged with at least a portion of an object disposed upon the conveyor surface. Further, in certain embodiments, the method may further comprise selectively adjusting a wheel set base of a wheel set of the plurality of wheel sets between a plurality of wheel set base positions, wherein the wheel set base is configured to support each of the plurality of wheels of the corresponding wheel set so as to restrict the linear displacement of each of the plurality of wheels of the corresponding wheel set relative to the wheel set base, and wherein a directional configuration of each of the plurality of wheel sets may be based at least in part on the wheel set base position of the corresponding wheel set base.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

The words "example," or "exemplary," when used herein, are intended to mean "serving as an example, instance, or illustration." Any implementation described herein as an "example" or "exemplary embodiment" is not necessarily preferred or advantageous over other implementations.

Conveyor assemblies may be used in, for example, industrial manufacturing and packaging applications to facilitate the transportation of objects to a desired delivery location within a factory or a warehouse. In some logistical scenarios, conveyor assemblies may comprise an intricate web of conveyor sections defined by various intersections, checkpoints, and alternative travel paths based upon a particular characteristic of the object traveling throughout the assembly. In such circumstances, a conveyor may comprise an apparatus such a diverter apparatus configured to physically direct the aforementioned objects to one of a plurality of alternative travel paths. In various embodiments, a diverter apparatus may be positioned proximate an intersection of adjacent conveyor sections and may comprise one or more rollers, wheels, bearings, and/or the like that are configured to divert an object traveling along the conveyor in a first direction towards an adjacent conveyor section extending in a second direction that is distinct from the original travel direction of the object.

For example, various diverter apparatuses may utilize pneumatic components in order to execute the actuation of a diversion mechanisms. In certain circumstances, however, installation of a conveyor system having various pneumatic components can be cumbersome and expensive.

Alternatively or additionally, a diverter apparatus may comprise electric diversion actuation components. In such circumstances, an electronic signal may be transmitted to a diverter apparatus so as to configure each of a plurality of rollers and/or rows of wheels defining a conveyor surface in a diversion configuration. Such a configuration requires the subsequent objects traveling along the conveyor surface to be sufficiently spaced apart such that a first object is clear of a diverter conveyor surface before the second, subsequent object may engage the diverter conveyor surface, thereby reducing the efficiency and overall capacity of such a conveyor system.

Further, certain electric diverter apparatuses utilize cam-operated diverter actuators, such that the directional configuration of the diverter apparatus (e.g., between a straight directional configuration and a diversion configuration) is driven by the interaction of a cam assembly configured to use the rotational motion of a cam to generate a diverter actuation from a first directional configuration to a diversion configuration. In such circumstances, a cam may be configured to engage a cam follower at a single point of engagement such that the rotation of the cam drives the cam follower in a first direction, where the diverter apparatus may be configured to transmit that directional force so as to cause, for example, a plurality of wheels or rollers to pivot to a diversion configuration. In such circumstances, however, upon driving the cam follower in a first direction, the cam cannot effectively retract that motion so as to reconfigure the diverter apparatus from a diversion configuration to the original first directional configuration. As such, a diverter apparatus may comprise one or more mechanical components such as, for example, a spring configured to return the diverter apparatus to the original directional configuration. In such circumstances, repeatedly using a biasing mechanism, such a spring, may lead to premature failure of the apparatus caused by, spring fatigue and/or other similar deficiencies associated with such components. Such diverter apparatuses not only experience decreased efficiency and product lifespan, but they require a large amount of power to operate on a routine basis.

Described in example embodiments herein is a diverter apparatus and method of using the same configured to utilize the rotation motion and dual configuration of a conjugate cam to efficiently and effectively actuate a diverter mechanism comprising a bidirectional range of motion between two directional configurations without requiring extraneous mechanical and/or pneumatic components. As described by way of the examples described herein, the diverter apparatus may be configured to utilize the conjugate cam and cam follower to generate rotational forces at each of the plurality of wheels comprising at least a portion of a diverter conveyor surface such that the wheels may rotate from a first angular configuration to a second angular configuration, and further from the second angular configuration, back to the first angular configuration. A conjugate cam, using a plurality of cam elements may be configured to generate both a pulling force and, separately, a pushing force via the corresponding cam follower in order to selectively control the directional configuration of the diverter apparatus between two corresponding directional configurations.

As discussed herein, certain embodiments of the present disclosure are directed to a diverter apparatus and method of using the same. In particular, various embodiments are directed to electronic diverter apparatuses configured to utilize cam-activated, bi-directional diverter actuation.

Figure 1:
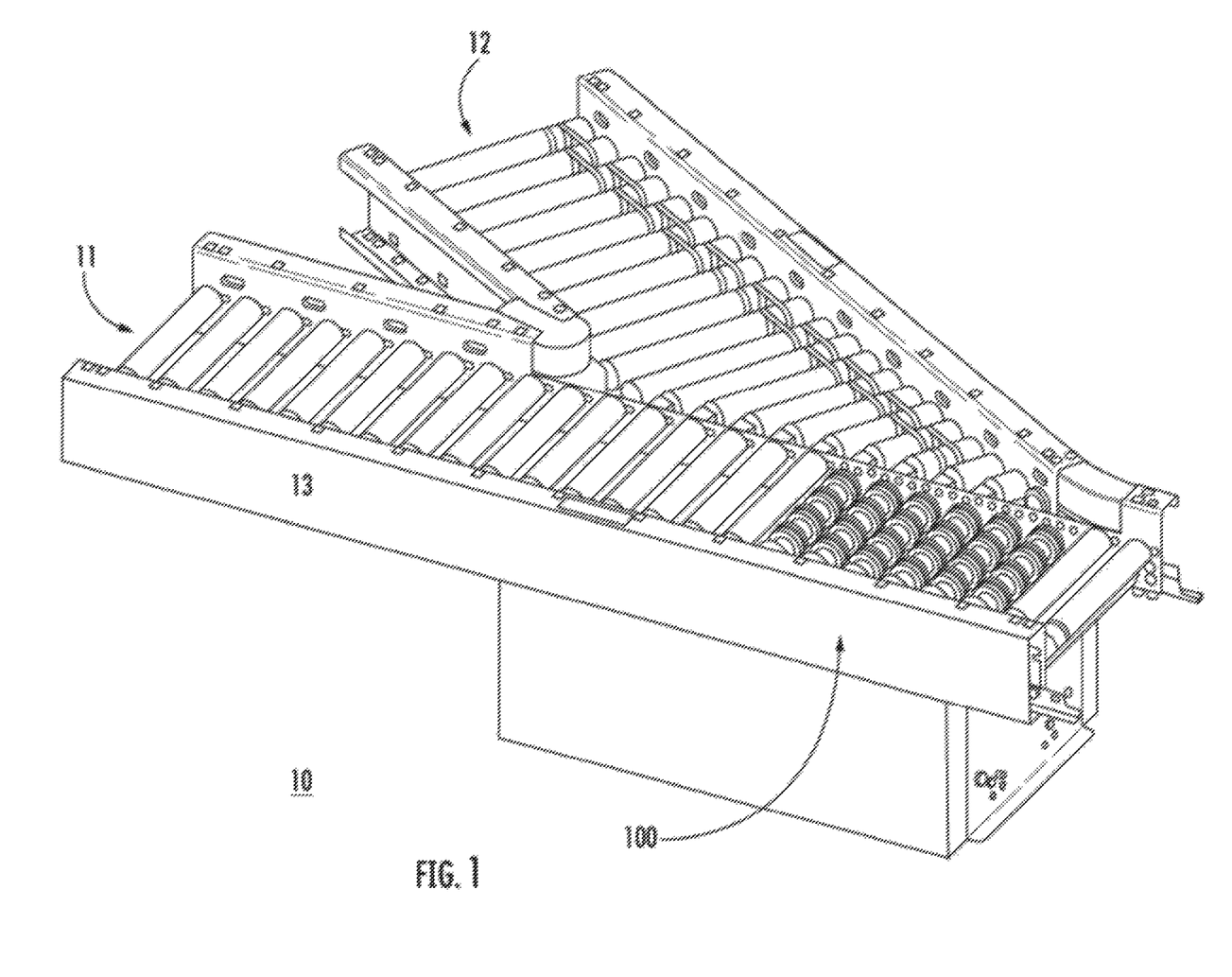
FIG. 1 illustrates a perspective view of a conveyor system encompassing an exemplary diverter apparatus configured in accordance with an example embodiment.

FIG. 1 illustrates a perspective view of a conveyor system encompassing an exemplary diverter apparatus configured in accordance with an example embodiment. As illustrated a conveyor system 10 may comprise a conveyor frame 13, which may comprise two opposing sidewalls extending in a direction corresponding to a conveyor travel path. The conveyor 10 may comprise a plurality of unidirectional rollers arranged between the opposite sidewalls of the conveyor frame 13 so as to define a conveyor surface extending along the conveyor travel path. In various embodiments, the conveyor 10 may comprise a plurality of conveyor sections, each respectively extending along a corresponding alternative conveyor travel path. As illustrated in FIG. 1, the conveyor assembly 10 may comprise a first conveyor section 11 and a second conveyor section 12 extending in a first conveyor direction and a second conveyor direction, respectively. In various embodiments, a conveyor assembly 10 may comprise a diverter apparatus 100 arranged in-line with plurality of rollers and configured to selectively direct an exemplary object (e.g., a package, parcel, part, and/or the like) traveling downstream along a conveyor travel path to one of either the first conveyor section 11 or the second conveyor section 12. As described herein, a diverter apparatus 100 may comprise a plurality of rollers (e.g., wheels) configured to define a diverter conveyor surface that may be at least substantially coplanar with at least an adjacent portion of the conveyor surface defined by the plurality of unidirectional rollers.

The diverter apparatus 100 may be configurable between a plurality of directional configurations, each directional configuration corresponding to one of a plurality of an alternative conveyor travel paths defined at least in part by a respective conveyor section of the conveyor assembly 10. For example, the diverter apparatus 100 may be configurable between a straight directional configuration, wherein an exemplary object traveling along the conveyor surface in a first conveyor direction will continue to travel in at least substantially the same direction upon engaging the diverter conveyor surface defined by the diverter apparatus 100, and a diversion configuration, wherein an exemplary object traveling along the conveyor surface in a first conveyor direction will, upon engaging the diverter conveyor surface, be diverted such that the exemplary object will travel in a second conveyor direction that is at least partially different from the first conveyor direction, as described herein. As described herein, in various embodiments, a diverter apparatus 100 comprising a diversion configuration may be such that the second conveyor direction (e.g., a diversion direction) may comprise a direction that is at least substantially different from the first conveyor direction. Additionally, or alternatively, in various embodiments, a diverter apparatus 100 exhibiting a diversion configuration may be configured so as to divert an exemplary object engaged therewith towards a particular portion (e.g., lane) of a conveyer section such that the exemplary object may, ultimately, continue to travel in the first conveyor direction upon being selectively diverted to the particular portion of the conveyor section.

A diversion configuration, as described herein, may be configured such that the travel path of an exemplary object traveling along the conveyor surface and through the diverter conveyor surface defined by the diverter apparatus 100 may comprise a non-linear profile. In various embodiments, the diverter apparatus 100 may be configured to selectively divert the travel path of an exemplary object traveling along the conveyor surface to a second conveyer section, wherein the second conveyor section is embodied as a branch of the conveyor assembly 10 extending from a first section of the conveyor assembly 10 and/or the diverter apparatus 100 in a second conveyor direction.

Figure 2:
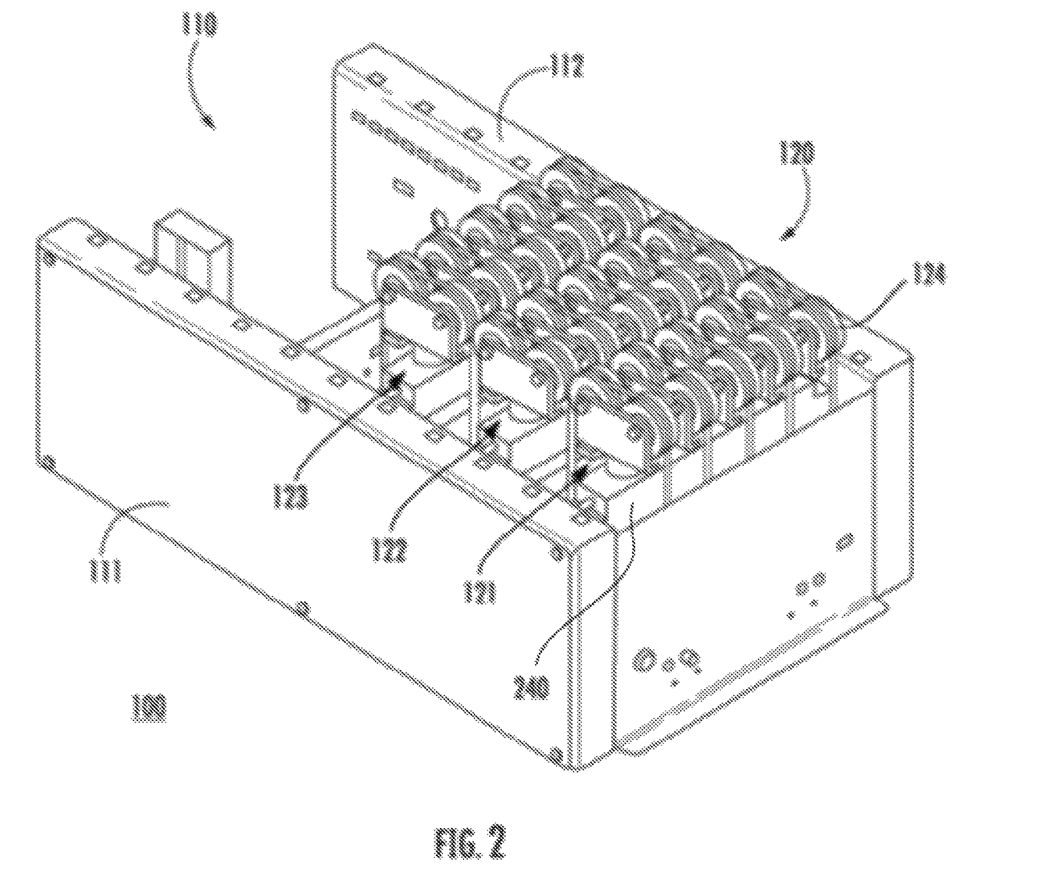
FIG. 2 illustrates a perspective view of an exemplary diverter apparatus configured in accordance with an example embodiment.

FIG. 2 illustrates a perspective view of an exemplary diverter apparatus 100 in accordance with an example embodiment. As illustrated, the exemplary diverter apparatus 100 comprises a diverter apparatus frame 110 configured such that the diverter apparatus may be arranged in-line with one or more adjacent conveyor sections of a conveyor assembly 10. The diverter apparatus frame 110 may comprise a first frame panel 111 and a second frame panel 112, each extending from a front end of the diverter apparatus to a back end of the diverter apparatus. In various embodiments, the first frame panel 111 and the second frame panel 112 may be arranged in an at least substantially parallel configuration relative to one another and such that a distance therebetween may be at least substantially similar to the width of the one or more adjacent conveyor sections.

In various embodiments, the diverter apparatus 100 may comprise at least one diverter wheel set 124. For example, as illustrated in FIG. 2, the exemplary diverter apparatus comprises three diverter wheel sets. In various embodiments, a diverter wheel set 124 may comprise a plurality of wheels 124 operatively attached to a diverter wheel set base 240 extending along a central linear axis, the plurality of wheels 124 being arranged in one or more rows along the diverter wheel set base 240. For example, the central linear axis of the diverter wheel set 124 (e.g., the diverter wheel set base 240) may extend between the first frame panel 111 and the second frame panel 112 of the diverter apparatus frame 110. In various embodiments, the plurality of wheels 124 of a diverter wheel set 124 may comprise one or more wheel pairs, wherein a wheel pair comprises a first wheel and a second wheel arranged within the same horizontal plane and positioned proximate to one another and such that the first wheel is in front of the second wheel with respect to the directional configuration of the diverter apparatus 100 (e.g., when measured from the front end to the back end of the diverter apparatus 100). The first wheel and the second wheel of a wheel pair may be aligned so as to be directionally aligned. For example, as illustrated, the plurality of wheels 124 of the exemplary diverter wheel set comprises five wheel pairs, each of which is disposed about a common diverter wheel set base 240 so as to define two rows of wheels extending between the first frame panel 111 and the second frame panel 112. Although described in reference to various embodiments as comprising a first wheel and a second wheel, it should be understood that in various embodiments, a wheel pair, as described herein, may comprise more than two wheels, such as, for example, three wheels, five wheels, seven wheels, and/or the like. As described herein, the plurality of wheels 124 of the at least one diverter wheel set may define a diverter conveyor surface 120 comprising a horizontal plane upon which an exemplary object may be disposed. The diverter conveyor surface 120 may be configured such that the exemplary object disposed thereon may travel from a front end of the diverter apparatus 100 to a back end of the diverter apparatus 100 along a travel path defined, at least in part, according to the directional configuration of the diverter apparatus 100. For example, the diverter conveyor surface 120 may be at least substantially coplanar with at least an adjacent conveyor surface defined by a plurality of unidirectional rollers of an adjacent conveyor section of the conveyor assembly 10.

Figure 3A:
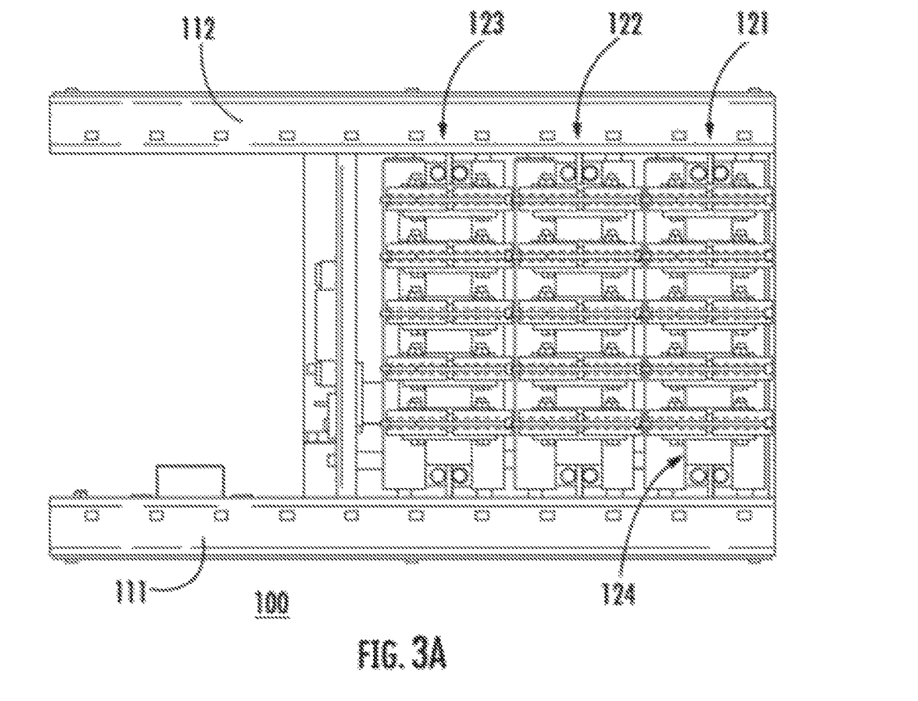
FIGS. 3A-3B illustrate top views of various exemplary diverter apparatuses configured in accordance with various embodiments described herein.
Figure 3B:
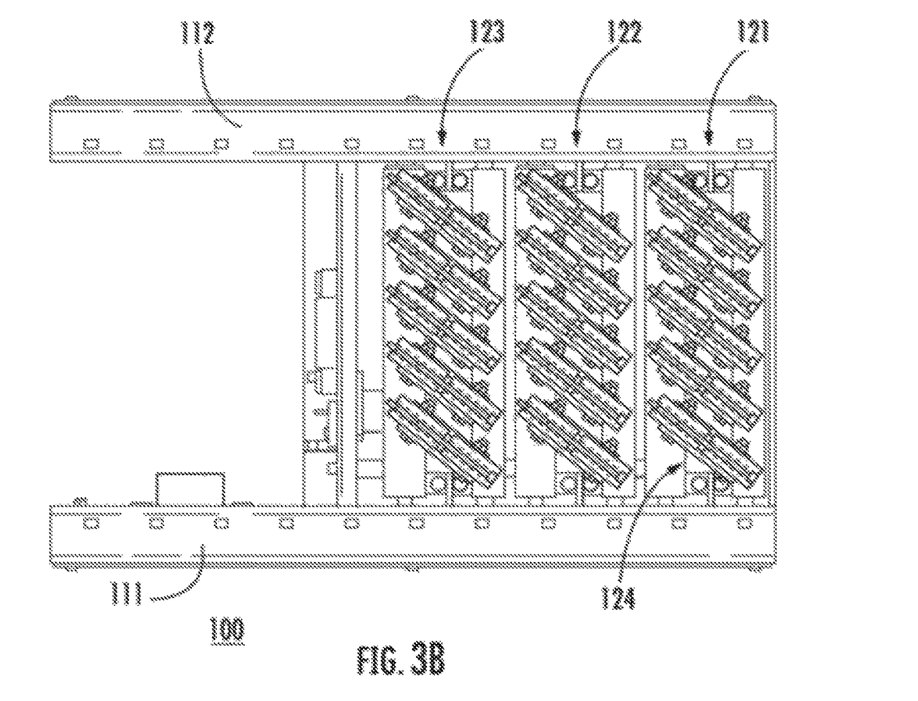

FIGS. 3A-3B illustrate top views of various exemplary diverter apparatuses configured in accordance with various embodiments described herein. As illustrated, and as described herein, each of the plurality of wheels 124 of diverter wheel set may be configured to rotate relative to the diverter apparatus frame 110 about a vertical axis so as to define the directional configuration of the diverter corresponding wheel set 124. In various embodiments, the directional configuration of at least a portion of the plurality of wheels 124 of a diverter wheel set may define, at least in part, the directional configuration of the diverter apparatus 100. For example, at least a portion of the plurality of wheels 124 in a diverter wheel set may be configurable between a straight directional configuration and a diversion configuration, as illustrated in FIGS. 3A and 3B, respectively. The diverter apparatus 100 may be configured such that a diversion configuration of one or more of the at least one diverter wheel sets 124 may correspond to a conveyor direction of an adjacent conveyor section, such that exemplary object traveling on the diverter conveyor surface 120 may be redirected towards the adjacent conveyor section. In various embodiments, each of the plurality of wheels 124 of a diverter wheel set may be controlled simultaneously such that each of the plurality of wheels 124 (e.g., each of the wheel pairs) is configured in the same directional configuration.

In various embodiments, wherein the diverter apparatus 100 comprises a plurality of diverter wheel sets 124, one or more of the plurality of diverter wheel sets 124 may be independently controlled such that a first diverter wheel set 121 may be configured in a straight directional configuration while a second wheel set 122 is configured in a diversion configuration. As illustrated in FIGS. 3A-3B, the diverter apparatus 100 comprises three diverter wheel sets 121, 122, 123, each having a plurality of wheels 124 defined by five wheel pairs. For example, as an exemplary object travels along the diverter conveyor surface 120, a front end of the exemplary object may first engage the plurality of wheels 124 of a first diverter wheel set 121, followed in sequence by those of a second diverter wheel set 122, and a third diverter wheel set 123. Similarly, a back end of the exemplary object may first disengage the first diverter wheel set 121, then the second diverter wheel set 122, and lastly the third diverter wheel set 123. In order to redirect the exemplary object to an adjacent conveyor section such that it may exhibit a non-linear travel path, the first diverter wheel set 121 may be selectively configured in a diversion configuration prior to the front end thereof engaging one or more of the plurality of wheels 124 of the first diverter set 121. In such a circumstance, the second and third diverter wheel sets 122, 123 may be similarly selectively configured in a diversion configuration prior to the front end of the exemplary object engaging the respective pluralities of wheels thereof. In various embodiments, the each of the diverter wheel sets 121, 122, 123 may remain in a diversion configuration until it is determined that the back end of the exemplary object has disengaged the corresponding plurality of wheels 124 (e.g., that the exemplary object has traveled past the diverter wheel set). For example, where the diverter apparatus 100 may be configured such that the back end of the exemplary object may first disengage the first diverter wheel set 121, the configuration first diverter wheel set 121 may be selectively transitioned from the diversion configuration to a straight directional configuration upon the exemplary package disengaging therewith, based at least in part on the predetermined travel path of a subsequent exemplary package. In such a circumstance, wherein the exemplary object has disengaged the first diverter wheel set 121, but remains engaged with both the second and third diverter wheel sets 122, 123, the first diverter wheel set 121 may comprise a straight directional configuration while the second and third diverter wheel sets 122, 123 remain in a diversion configuration. As described herein, such a configuration wherein one or more of a plurality of diverter wheel sets of a diverter apparatus is independently controllable may reduce the requisite amount of space and/or time required between an exemplary object travelling to a first adjacent conveyor section and an immediately subsequent exemplary object travelling to a second adjacent conveyor section extending in a different direction than the first adjacent conveyor section.

Figure 4:
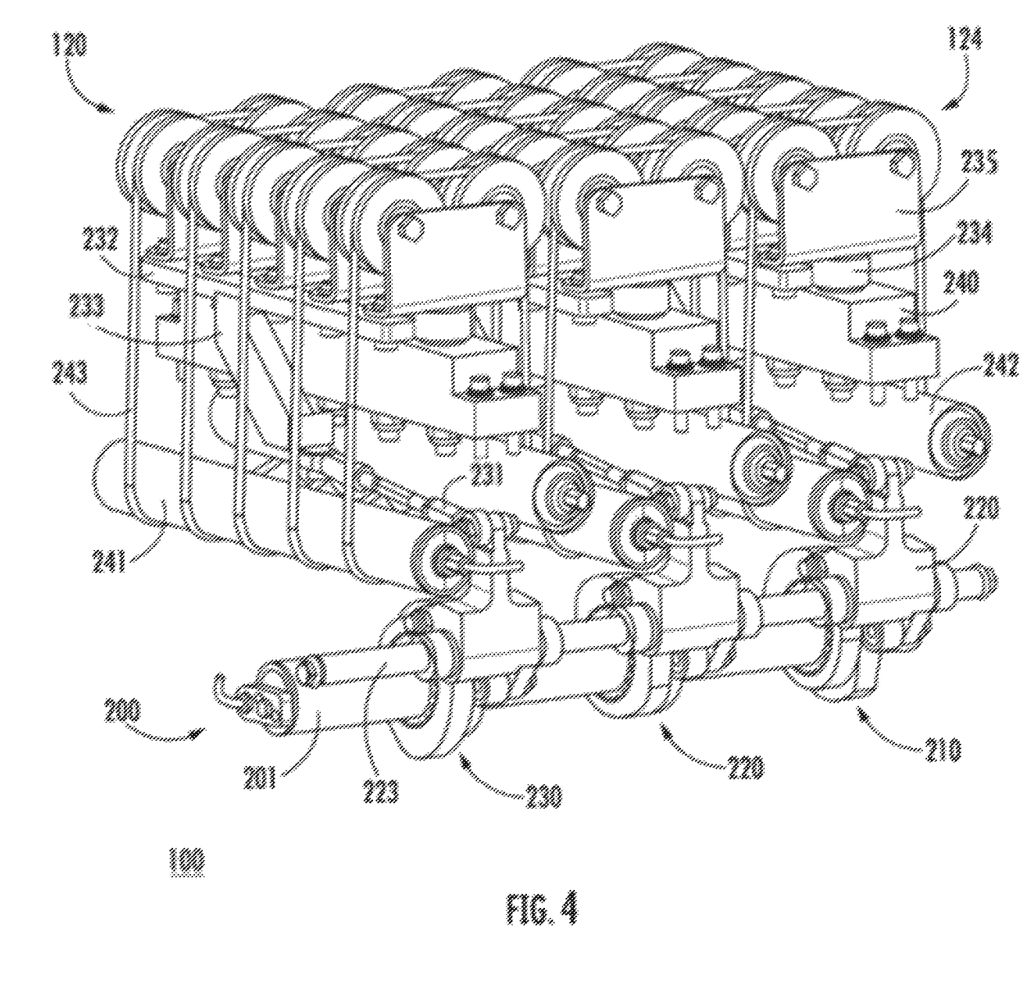
FIG. 4 illustrates a perspective view of various components of an exemplary diverter apparatus in accordance with an example embodiment.

FIG. 4 illustrates a perspective view of various components of an exemplary diverter apparatus in accordance with an example embodiment. In particular, the exemplary diverter apparatus displayed in FIG. 4 comprises three diverter wheel sets. As illustrated, each of the exemplary diverter wheel sets comprises a plurality of wheels 124 defined by five wheel pairs, each wheel pair being disposed about a common diverter wheel set base 240 so as to define two rows of wheels. In various embodiments, the two wheels of each wheel pair may both be attached to a common wheel pair frame element 235, which may secure the arrangement of each wheel and ensure that the two wheels of a wheel pair remain aligned so as to comprise the same directional configuration. Further, the two wheels of each wheel pair of a diverter wheel set may both be operatively connected to the diverter wheel set base 240 of the diverter wheel set via rotatable wheel stem 234, rotatable about a vertical axis extending therethrough.

In various embodiments, each diverter wheel set may comprise a wheel drive assembly. For example, a wheel drive assembly may be configured to drive each of the plurality of wheels 124 of the diverter wheel set such that they may spin at a desired rate to facilitate the movement of an exemplary object travelling along an at least substantially flat diverter conveyor surface 120. In various embodiments, a wheel drive assembly may comprise at least one wheel drive roller 241 and a drive belt 243. As illustrated, the wheel drive assembly of each diverter wheel set comprises a first wheel drive roller 241, a second wheel drive roller 242, and a plurality of drive belts 243, each drive belt 243 thereof corresponding respectively to a wheel pair of the plurality of wheel pairs defined by the diverter wheel set, as described herein. Each drive belt 243 may be configured so as to be physically engaged with at least one a wheel drive roller and a wheel of the plurality of the wheels of the diverter wheel set. For example, as shown in FIG. 4, a drive belt 243 may be configured to be extend around a first wheel drive roller 241, a second wheel drive roller 242, and both wheels of a wheel pair, physically engaging each of the aforementioned components. In various embodiments, one or both of the first roller and second rollers may be driven by a motor such that the roller may be configured to rotate about a central axis thereof based at least in part on power supplied to the wheel drive roller by a drive motor (not shown). The drive assembly of a diverter wheel set may be configured such that the rotation of the motor-driven wheel drive roller (e.g., the first wheel drive roller 241) drives the motion of at least one wheel drive belt 243 physically engaged therewith, thereby generating, via the wheel drive belt 243, a rotational force at each wheel of a wheel pair in contact with the wheel drive belt 243 causing each wheel of the wheel pair to spin. As described herein, the spinning motion of the plurality of wheels 124 of a diverter wheel set may facilitate the movement of an exemplary object disposed upon a diverter conveyor surface 120 in a direction corresponding to the directional configuration of the diverter wheel set. The spin rate of each of the wheels of a diverter wheel set may correspond at least in part to the rate of rotation of a motor-driven wheel drive roller of the wheel drive assembly of the diverter wheel set.

In various embodiments, a diverter wheel set may further comprise a diversion actuation assembly to configure the diverter wheel set between a plurality of directional configurations. For example, a diversion actuation assembly may cause the plurality of wheels 124 of a diverter wheel set to transition between a straight directional configuration and a diversion conversion, as described herein. In various embodiments, as non-limiting examples, a diversion actuation assembly may comprise a cam assembly 200 comprising a driven cam shaft 201 and a conjugate cam, such as, for example, conjugate cam 230, a cam follower 220, a cam follower shaft 223, a rigid linear motion arm 231, and a wheel set synchronization element 232. As illustrated, in various embodiments, the diversion actuation assembly may comprise a wheel interface attachment 233 configured to operatively connect the rigid linear motion arm 231 to the wheel set synchronization element 232 such that a directional force acting on the rigid linear motion arm 231 may be transferred to the wheel set synchronization element 232. In various embodiments, wherein the diverter apparatus 100 comprises a plurality of diverter wheel sets, the diversion actuation assembly of each diverter wheel set may comprise a corresponding conjugate cam, such as, for example, conjugate cam 230, a cam follower 220, a rigid linear motion arm 231, a wheel interface attachment 233, and a wheel set synchronization element 232.

As described herein, a diversion actuation motor (not shown) may be configured to cause the cam shaft 201, and a conjugate cam attached thereto, such as, for example, conjugate cam 230, to rotate about a central horizontal axis of the cam shaft 201. The diversion actuation assembly may be configured such that the rotational motion of the conjugate cam may cause a force to be exerted from the conjugate cam to a corresponding cam follower 220 physically engaged therewith. The force exerted on the cam follower 220 may cause the cam follower 220 to move, such as, for example, in a rotational direction about a cam follower shaft 223. In various embodiments, the diversion actuation assembly may be configured such that the rotational displacement of the cam follower 220 may cause a force to be exerted from the cam follower 220 to a first end of a rigid linear motion arm 231 connected thereto. For example, the linear force transmitted to the rigid linear motion arm 231 may comprise either a pushing force or a pulling force and may result in the linear displacement of the rigid linear motion arm 231 in a direction and an amount that corresponds to the rotational displacement of the cam follower 220 to which a first end of the rigid linear motion arm 231 is attached. In various embodiments, the second end of the rigid linear motion arm 231 may be attached to a wheel interface attachment 233 attached to a wheel set synchronization element 232. The wheel interface attachment 233 may be configured such that the linear motion of the second end of the rigid linear motion arm 231 may generate a linear directional force that is transmitted to the wheel set synchronization element 232, thereby causing the wheel set synchronization element 232 to undergo a linear displacement mirroring that of the rigid linear motion arm 231. As described herein, wheel set synchronization element 232 may be operatively connected to each of the plurality of wheels 124 (e.g., wheel pairs) of a diverter wheel set such that the linear displacement thereof may cause each of the plurality of wheels 124 (e.g., wheel pairs) of the diverter wheel set to rotate about a vertical axis defined by the rotatable wheel stem 234 so as to transition from a first directional configuration to a second directional configuration. For example, the direction and magnitude of angular rotation of the plurality of wheels 124 may correspond, at least in part, to those of the linear displacement of the rigid linear motion arm 231 to which each of the plurality of wheels 124 may be operatively attached (e.g., via the wheel set synchronization element 232). As described herein, the directional configuration of each of the plurality of wheels 124 of a diverter wheel set may be configured to correspond to the position of the second end of the rigid linear motion arm 231.

Figure 5:
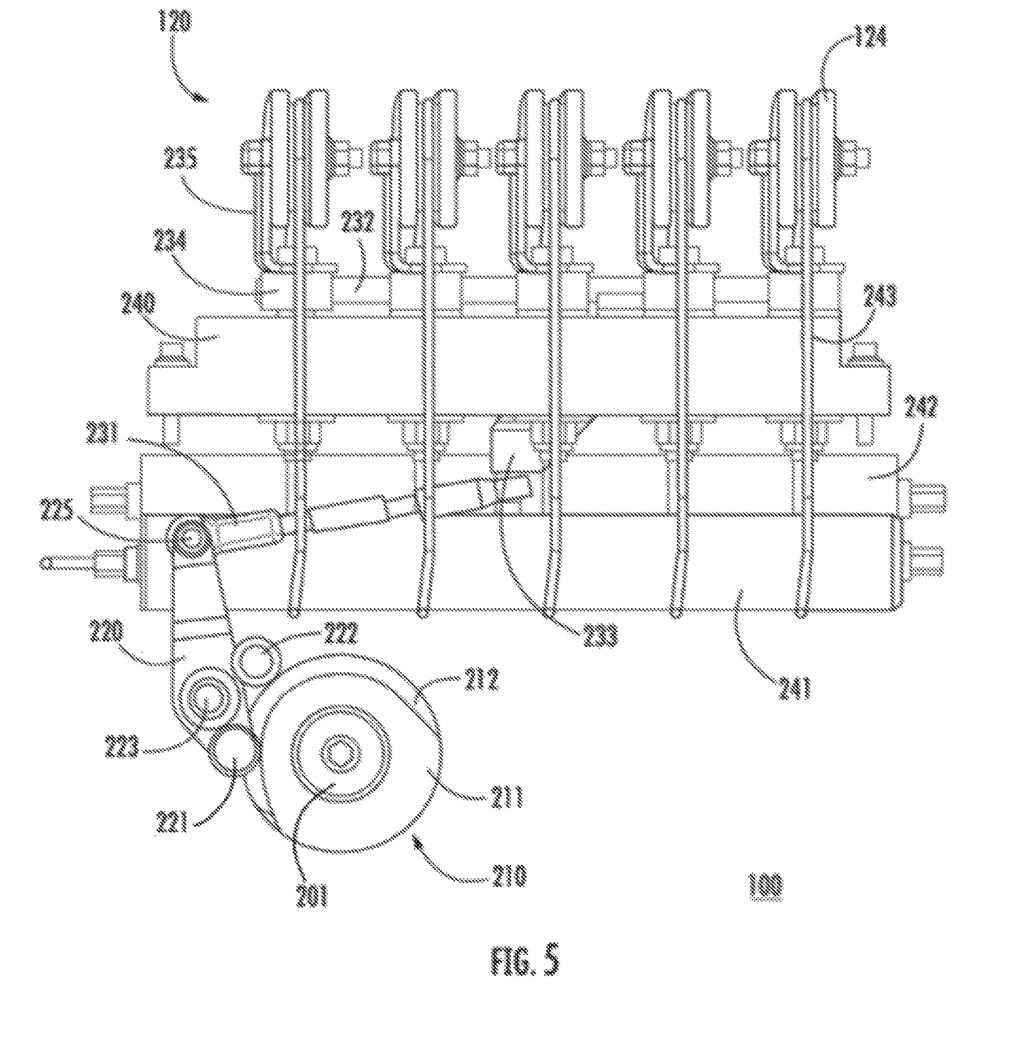
FIG. 5 illustrates a side view of various components of an exemplary diverter apparatus in accordance with an example embodiment.

FIG. 5 illustrates a side view of various components of an exemplary diverter apparatus in accordance with an example embodiment. In particular, the exemplary diverter apparatus displayed in FIG. 5 comprises a diverter wheel set comprising a diversion actuation assembly configured to utilize a conjugate cam 210 engaged with a corresponding cam follower 220 to facilitate the bi-directional rotation of the plurality of wheels 124 between a straight directional configuration and a diversion configuration. As described in further detail herein, conjugate cam 210 may comprise a plurality of cam elements, such as, for example, a first cam element 211 and a second cam element 212, arranged at least substantially proximate to one another, each of the plurality of cam elements comprising a respective peripheral profile defined by an outer surface thereof. For example, the first cam element 211 and the second cam element 212 of conjugate cam 210 may be fixedly secured to the cam shaft 201 such that when the cam shaft 201 rotates about a central axis, both the first cam element 211 and the second cam element 212 may similarly and simultaneously rotate about the central axis of the cam shaft 201.

As shown, in various embodiments, the diverter apparatus 100 may comprise at least one cam follower 220, which may correspond to the at least one conjugate cam 210. A cam follower shaft 223 may extend through a portion of the cam follower 220 such that the cam follower 220 may be rotatably connected to the cam follower shaft 223. For example, the cam follower shaft 223 may be a static component comprising a central axis, about which the cam follower 220 secured thereto may rotate in either a clockwise or counter clockwise direction in response to various forces applied to the cam follower 220 by the corresponding conjugate cam 210. In various embodiments, the cam follower 220 may comprise a plurality of cam element interfaces 221, 222 fixedly attached to the cam follower 220, each of which may be configured to physically engage an outer peripheral surface of a respective cam element 211, 212. For example, the cam follower 220 may comprise a first cam element interface 221 configured to remain in contact with the first cam element 211 of the conjugate cam 210, and a second cam element interface 222 configured to remain in contact with the second cam element 212 of the conjugate cam 210. Both the first cam element interface 221 and the second cam element interface 222 may be configured to remain in contact with the peripheral outer surface of the corresponding cam element throughout the entirety of a rotation of the corresponding cam element about the central axis of the cam shaft 201. In various embodiments, the cam follower 220 may comprise an upper portion and a lower portion, defined by a portion of the cam follower 220 above the central axis of the cam follower shaft 223 (e.g., the axis of rotation of the cam follower 220) and below the central axis of the cam follower shaft 223, respectively. In various embodiments, at least one of the plurality of cam element interfaces may be disposed within a lower portion of the cam follower 220 while at least one of the plurality of cam element interfaces may be disposed within an upper portion of the cam follower 220. For example, as illustrated, the first cam element interface 221 may be positioned within the lower portion of the cam follower 220 and the second cam element interface 222 may be positioned within an upper portion of the cam follower 220.

As described in greater detail herein, an exemplary cam element may be configured such that a radial distance between the central axis of the cam shaft 201 (e.g., a rotational axis of the cam element) and an outer peripheral surface of the cam element may vary as, measured at various angular locations about the periphery of the cam element. For example, wherein the peripheral profile of a cam element 211 is defined by a non-constant radius (e.g., between the outer peripheral surface and the central axis of the cam shaft 201) and wherein the cam element interface 221 of the cam follower 220 may be configured to remain in contact with the outer surface of the cam element 211, the cam element 211 may apply a variable force to the cam element interface 221 in contact therewith as the cam element 211 rotates about the central axis of the cam shaft 201. As the cam element 211 rotates about the central axis of the cam shaft 201, the cam element interface 221 may transition from contacting a first angular portion of the cam element 211 to contacting a second angular portion of the cam element 211, wherein the second angular portion of the cam element 211 comprises a larger radius than the first angular portion. In such a circumstance, the cam element 211 may exert a pushing force onto the corresponding first cam element interface 221 in an outward radial direction. Similarly, as the cam element 212 rotates about the central axis of the cam shaft 201, the cam element interface 222 may transition from contacting a first angular portion of the cam element 212 to contacting a second angular portion of the cam element 212, wherein the second angular portion of the cam element 212 comprises a larger radius than does the first angular portion. In such a circumstance, the cam element 212 may exert a pushing force onto the corresponding first cam element interface 222 in an outward radial direction.

In various embodiments, the first cam element interface 221 of the cam follower 220 may be positioned within a lower portion of the cam follower 220 and the second cam element interface 222 may be positioned within an upper portion of the cam follower 220, as described herein. Accordingly, wherein a force is applied to either the first cam element interface 221 or the second cam element interface 222 by a cam element 211, 212 in contact therewith, the force may be transmitted to either the upper portion or the lower portion of the cam follower 220, causing the cam follower 220 to rotate in either a clockwise or counterclockwise direction about the central axis of the cam follower shaft 223 in response. For example, in the exemplary embodiment illustrated in FIG. 5, as the second cam element 212 is rotated about the central axis of the cam shaft 201 such that the peripheral profile thereof causes a force to be applied to the second cam element interface 222 in a radially outward direction, the force may be transmitted to an upper portion of the cam follower, thereby causing the cam follower 220 to rotate about the cam follower shaft 223 in a counterclockwise direction. Further, as shown, as first cam element 211 is rotated about the central axis of the cam shaft 201 such that the peripheral profile thereof causes a force to be applied to the first cam element interface 221 in a radially outward direction, the force may be transmitted to a lower portion of the cam follower, thereby causing the cam follower 220 to rotate about the cam follower shaft 223 in a clockwise direction.

As described herein, a diversion actuation assembly of a diverter wheel set 121 may further comprise rigid linear motion arm 231 connected to the cam follower 220 such that the rotation of the cam follower 220 about a central axis of the cam follower shaft 223 may result in the linear displacement of the rigid linear motion arm 231. A rigid linear motion arm 231 may comprise a component configured to translate the rotational motion of a cam follower 220 attached thereto into a linear force that may transmitted to one or more diverter assembly 100 components in order to reconfigure the directional configuration of the plurality of wheels 124 of a diverter wheel set 121 from a first directional configuration to a second directional configuration. The rigid linear motion arm 231 may comprise a first end and a second end. For example, the first end of the linear motion arm 231 may be secured to a cam follower 220 and the second end of the rigid linear motion arm 231 may be operatively attached to each of the plurality of wheels 124 (e.g., via the wheel set synchronization element 232 and/or a wheel interface attachment 233). As shown in FIG. 5, wherein the conjugate cam 210 transmits a force to an upper portion of the cam follower 220 such that the cam follower 220 rotates about the cam follower shaft 223 in a counterclockwise direction, the force received by the cam follower 220 may be transmitted to the rigid linear motion arm as a pushing force at the first end of the rigid linear motion arm 231 in a direction towards the second end of the rigid linear motion arm 231. Further, wherein the conjugate cam 210 transmits a force to a lower portion of the cam follower 220 such that the cam follower 220 rotates about the cam follower shaft 223 in a clockwise direction, the force received by the cam follower 220 may be transmitted to the rigid linear motion arm 231 as a pulling force at the first end of the rigid linear motion arm 231 in a direction away from the second end of the rigid linear motion arm 231. For example, the bidirectional linear displacement of the second end of the rigid linear motion arm 231, which may be generated based at least in part on the configuration of the conjugate cam 210 and/or the cam follower 220 engaged therewith, may define a range of motion extending in a direction that is at least substantially parallel to a central axis of the diverter wheel set base 240.

In various embodiments, the second end of the rigid linear motion arm 231 may be connected to a wheel interface attachment 233. As described herein, the wheel interface attachment 233 may be configured to operatively connect the rigid linear motion arm 231 to a wheel set synchronization element 232 such that a directional force acting on the rigid linear motion arm 231 (e.g., from the cam follower 220) may be transferred to the wheel set synchronization element 232. The wheel interface attachment 233 may comprise a range of motion that may be at least substantially similar to that of the second end of the rigid linear motion arm 231. Accordingly, where the wheel interface attachment 233 may be attached to the wheel set synchronization element 232, the wheel set synchronization element 232 may also comprise a range of motion that is at least substantially similar to that of the second end of the rigid linear motion arm 231.

As described herein, the wheel set synchronization element 232 may comprise a means by which the directional configuration of each of the plurality of wheels 124 of a diverter wheel set may be simultaneously controlled. In various embodiments, the wheel set synchronization element 232 may comprise a substantially rigid element that is operatively attached to each of the plurality of wheels 124 (e.g., wheel pairs) of a diverter wheel set (e.g., via each of the wheel pair frame element 235, each of the rotatable wheel stems 234, and/or the like). Accordingly, the bi-directional linear displacement of the wheel set synchronization element 232, corresponding to that of the second end of the rigid linear motion arm 231 caused by the rotational displacement of the cam follower 220, may cause each of the plurality of wheels 124 (e.g., wheel pairs) to which the wheel set synchronization element 232 is operatively connected to rotate about a respective vertical axis defined by the rotatable wheel stem 234. For example, where the cam elements 211, 212 of the conjugate cam 210 are engaged with the cam follower 220 (e.g., the cam element interfaces 221, 222) so as to generate a pushing force at the rigid linear motion arm 231, the second end of the rigid linear motion arm 231, and thus, the wheel set synchronization element 232, as described herein, may be linearly displaced, in a first linear direction. Based at least in part on an operative attachment of the wheel set synchronization element 232 to each of the plurality of rotatable wheel stems 234 respectively supporting the plurality of wheels 124 of a diverter wheel set, the linear displacement of the wheel set synchronization element 232 may generate a rotational force at each of the rotatable wheel stems 234. The rotational force transmitted to each of the plurality of rotatable wheel stems 234 may cause each respective rotatable wheel stems 234 to rotate about the central vertical axis defined by the respective rotatable wheel stem 234. Accordingly, each of the plurality of wheels 124 of the diverter wheel set may experience an angular displacement having a magnitude corresponding at least in part to that of the linear displacement of the wheel set synchronization element 232 and/or the rigid linear motion arm 231.

As described herein, the diverter apparatus 100 may be configured to utilize the conjugate cam 210 and cam follower 220 to generate rotational forces at each of the plurality of wheels 124 of a diverter wheel set such that the wheels may rotate from a first angular configuration to a second angular configuration, and further from the second angular configuration, back to the first angular configuration, wherein the first angular configuration and the second angular configuration comprise a straight directional configuration and a diversion configuration. A conjugate cam 210, using a plurality of cam elements 211, 212, as described herein, may be configured to generate both a pulling force and, separately, a pushing force at the rigid linear motion arm 231 (e.g., via the corresponding cam follower 220) in order to selectively control the directional configuration of the diverter apparatus between two corresponding directional configurations. For example, the conjugate cam 210 may be configured such that as the cam shaft 201 rotates and drives the cam elements 211, 212 through at least a first portion of the rotational (e.g., angular) range of motion about the central axis of the cam shaft 201, the cam elements 211, 212 may collectively engage the cam follower 220 so as to stabilize the cam follower 220 in a rotational configuration about the cam follower shaft 223 that causes the rigid linear motion arm 231 to move the wheel set synchronization element 232 such that each of the plurality of wheels 124 of the diverter wheel set is in a diversion configuration. The conjugate cam 210 may be further configured such that as the cam shaft 201 continues to rotate and drive the cam elements 211, 212 through at least a second portion of the rotational (e.g., angular) range of motion about the central axis of the cam shaft 201, the cam elements 211, 212 may collectively engage the cam follower 220 so as to stabilize the cam follower 220 in a rotational configuration about the cam follower shaft 223 that causes the rigid linear motion arm 231 to move the wheel set synchronization element 232 such that each of the plurality of wheels 124 of the diverter wheel set is in a straight directional configuration.

As described the directional configuration of the plurality of wheels 124 of a diverter wheel set is based at least in part on the configuration and/or positioning relative to a diverter wheel set base 240 of a rigid linear motion arm 231 connected to the cam follower 220. In various embodiments, the angular disposition of the plurality of wheels 124 of a diverter wheel set in one or more directional configurations may be selectively modified by adjusting the lateral position of the diverter wheel set base 240 along an axis extending between the two side frame panels of the diverter apparatus 100 relative to the rigid linear motion arm 231. For example, in various embodiments, a diverter wheel set base 240 may comprise a plurality of attachment features (e.g., apertures, bolts, screws, hooks, latches, and/or the like) which may be selectively utilized so as to position the diverter wheel set base 240 in a particular lateral position relative to the rigid linear motion arm 231 so as to define and/or eliminate an offset angle defined by a directional configuration. Alternatively, or additionally, the lateral position of the diverter wheel set base 240 relative to the rigid linear motion arm 231 may be selectively adjusted by modifying the configuration of the rigid linear motion arm 231. For example, in various embodiments, the rigid linear motion arm 231 may be extendable and retractable so as to facilitate the adjustability of the angular arrangement of the plurality of wheels 124 of a diverter wheel set and, accordingly, one or more of the directional configurations of the diverter apparatus.

Figure 6:
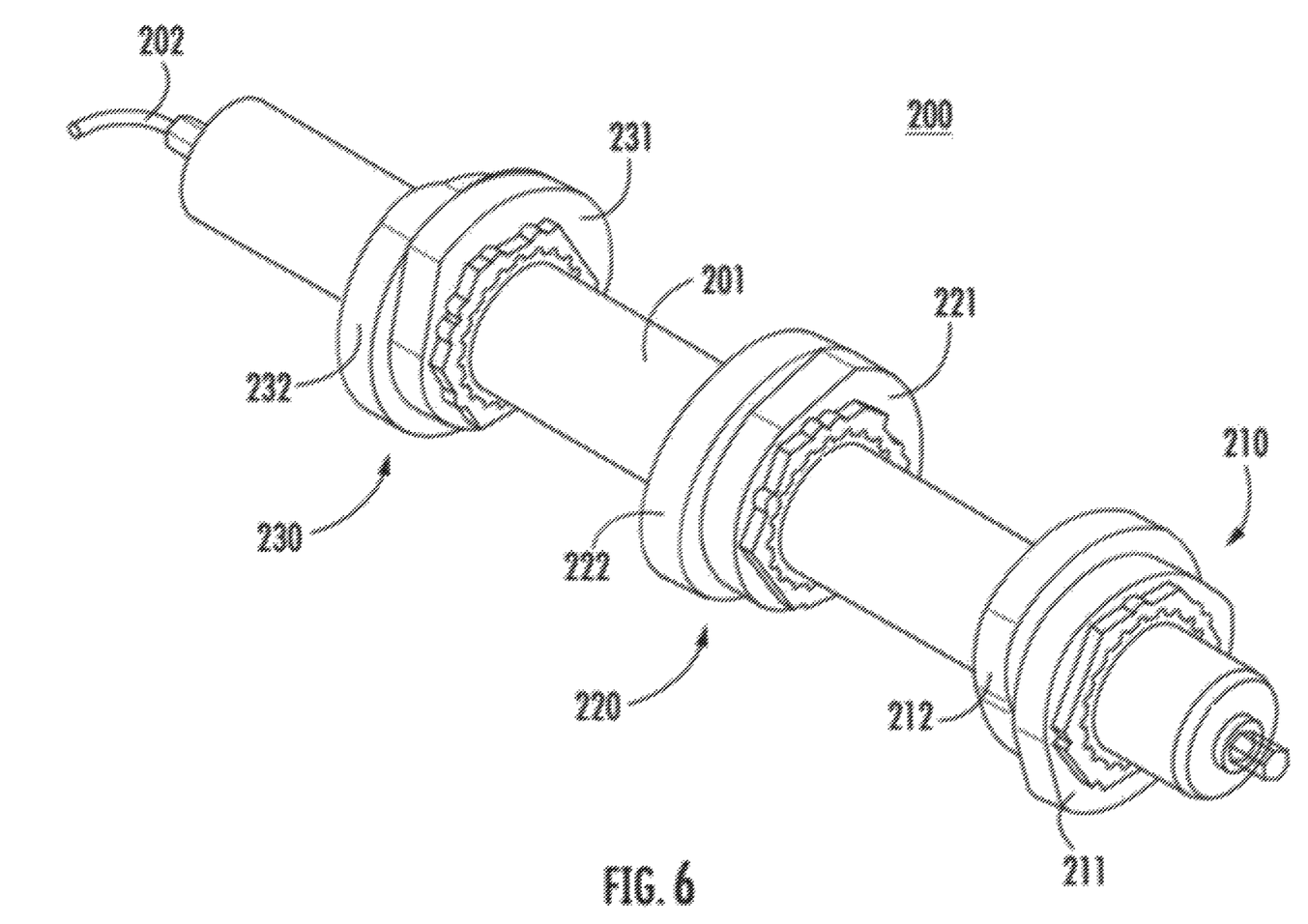
FIG. 6 illustrates a perspective view of various components of an exemplary diverter apparatus in accordance with an example embodiment.

FIG. 6 illustrates a perspective view of various components of an exemplary diverter apparatus in accordance with an example embodiment. In particular, FIG. 6 illustrates a perspective view of an exemplary cam assembly in accordance with an example embodiment. As illustrated, a cam assembly 200 of an exemplary diverter apparatus may comprise a plurality of conjugate cams disposed along a length of a cam shaft 201. For example, as illustrated, the plurality of conjugate cams may comprise a first conjugate cam 210, a second conjugate cam 220, and a third conjugate cam 230. The plurality of conjugate cams may comprise a conjugate cam corresponding to each of the diverter wheel sets, as described herein, thereby enabling the directional configuration of each diverter wheel set to be independently controlled. In various embodiments, each conjugate cam 210, 220, 230 of the exemplary cam assembly comprises two cam elements, which are configured to facilitate the bidirectional movement of the plurality of wheels 124 of the corresponding diverter wheel set between a straight directional configuration and a diversion configuration, as described herein. The rotation of the cam shaft 201, and thus, each of the plurality of conjugate cams secured thereto, may be driven by a motor, which may be communicatively connected to the cam shaft via one or more electrical connections 202.

In various embodiments, each of the plurality of conjugate cams may be secured to the cam shaft the rate of rotation of the conjugate cam about the central axis of the cam shaft 201 may be defined by the rate of rotation of the cam shaft 201. For example, the rate of rotation of each of the plurality of conjugate cams may be at least substantially equal. In various embodiments, one or more conjugate cams may be fixed in an angular configuration about the central axis of the cam shaft 201 that is different than that of one or more of the other conjugate cams. For example, as illustrated, each of the plurality of conjugate cams 210, 220, 230 may be angularly offset from the other conjugate cams of the plurality. In such a configuration, the cam assembly may be configured to change the directional configuration of each of the corresponding diverter wheel sets at different times relative to one another. For example, as described herein, the plurality of conjugate cams may be configured so as to sequentially change the directional configuration of the plurality of diverter wheel sets so as to efficiently accommodate one or more packages traveling along a diverter conveyor surface, as described herein.

Figure 7A:
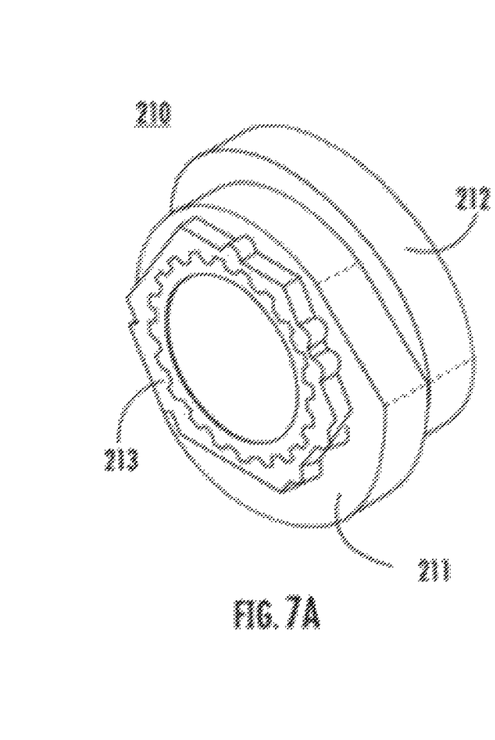
FIGS. 7A-7C illustrate various components of an exemplary diverter apparatus in accordance with an example embodiment.
Figures 7B, 7C:
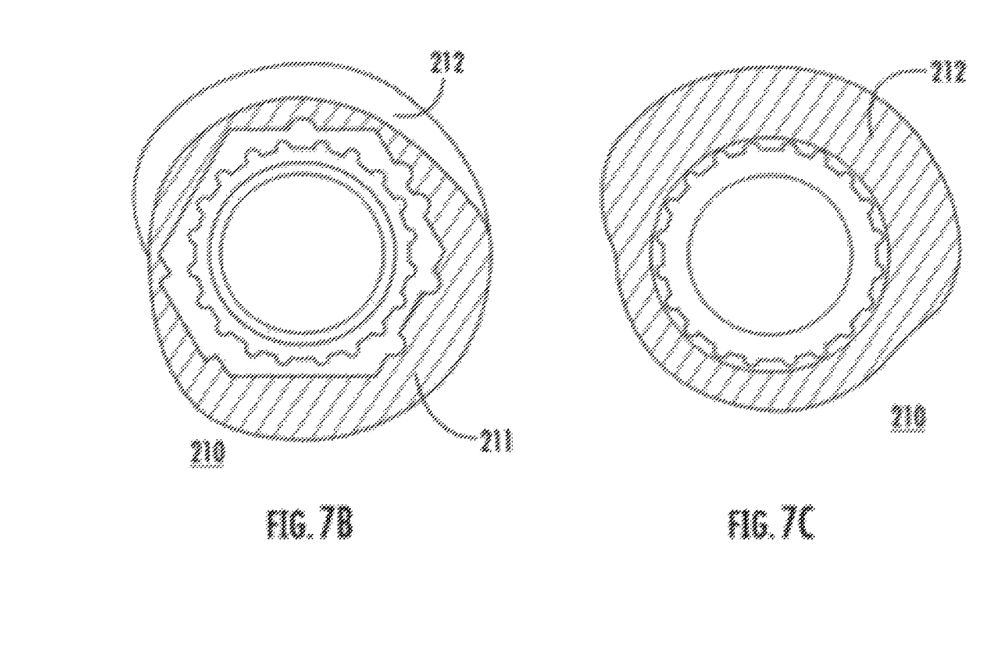

FIGS. 7A-7C illustrate various components of an exemplary diverter apparatus in accordance with an example embodiment. In particular, FIG. 7A illustrates a perspective view of an exemplary conjugate cam in accordance with various embodiments. Further, FIGS. 7B-7C illustrate cross-sectional views of various cam elements of an exemplary conjugate cam in accordance with various embodiments. As illustrated, conjugate cam 210 may comprise a first cam element 211 and a second cam element 212, which may be arranged at least substantially proximate to one another such that both cam elements 211, 212 may be simultaneously engaged by the same cam follower, as described herein. In various embodiments, the two cam elements of a conjugate cam may be fixedly secured to one another such that they may not move relative to one another. Further, each cam element 211, 212 may comprise an internal aperture 213 configured to receive at least a portion of the length of a cam shaft such that conjugate cam 210 may be fixedly secured to an external surface of the cam shaft extending therethrough.

In various embodiments, each cam element may comprise a peripheral profile defined by an outer peripheral surface thereof. For example, the outer peripheral surface of each cam element may be configured to engage a respective portion of the cam follower corresponding to conjugate cam 210. As illustrated in FIGS. 7B and 7C, respectively, the peripheral profiles of both the first cam element 211 and the second cam element 212 may be selectively configured so as to generate one or more forces at a cam follower engaged therewith as the conjugate cam rotates about the central axis of the cam shaft in a corresponding direction.

Figure 8A:
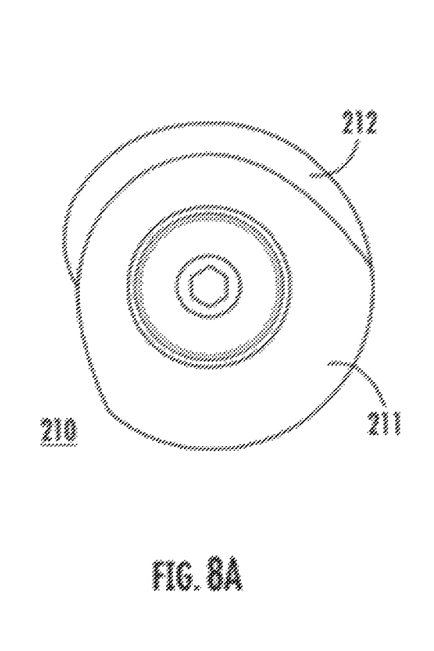
FIGS. 8A-8C illustrate various components of an exemplary diverter apparatus in accordance with an example embodiment.
Figure 8B:
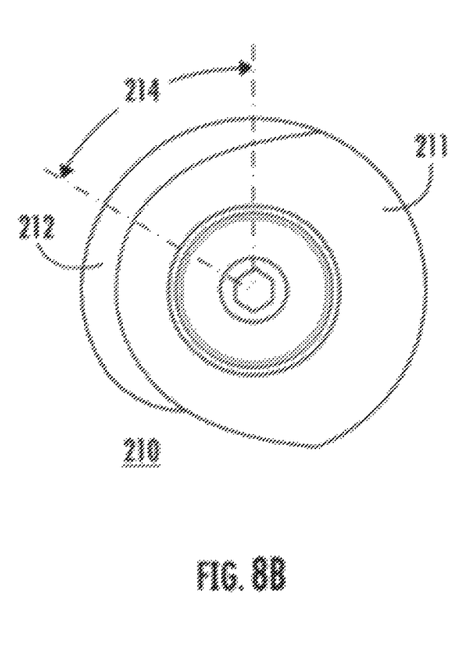
Figure 8C:
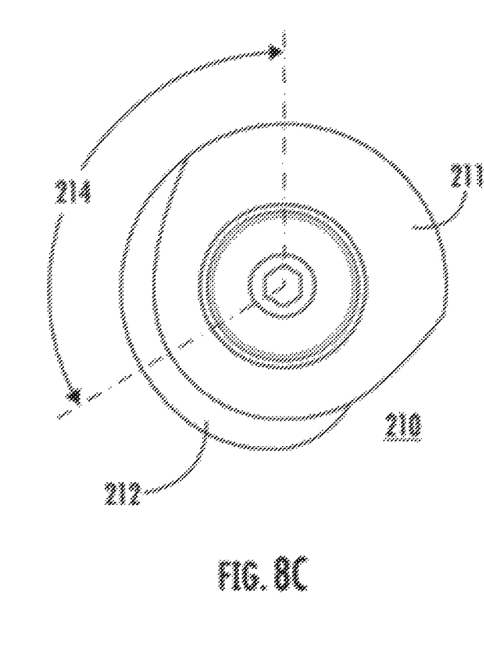

FIGS. 8A-8C illustrate various components of an exemplary diverter apparatus in accordance with an example embodiment. In particular, FIGS. 8A-8C illustrate various side views of exemplary conjugate cams arranged in various angular configurations about a center axis of a cam shaft in accordance with various embodiments. As illustrated, FIGS. 8A-8C depict conjugate cam 210 in three progressive angular configurations, which, collectively, may define at least a portion of the various angular configurations exhibited by a conjugate cam that is rotated about the central axis of a cam shaft so as to cause a diverter wheel set comprising a first directional configuration to transition to a second directional configuration and, subsequently, to transition back to the first directional configuration, as described herein. As described herein, the first directional configuration may be a straight directional configuration and the second directional configuration may be a diversion configuration. In various embodiments, conjugate cam 210 may be configured so as to facilitate the two aforementioned transitions in directional configuration (e.g., the transition from straight directional configuration to a diversion configuration and, subsequently, back to a straight directional configuration) during, for example, a single rotation of the conjugate cam 210 about the central axis of cam shaft (e.g., wherein the conjugate cam 210 traveled through an angular range of motion totaling 360 when measured from a starting position).

In various embodiments, conjugate cam 210 may comprise a first cam element 211 and a second cam element 212. The first cam element 211 may be configured to apply a force to an exemplary cam follower, as described herein, throughout at least a portion of the rotation of the conjugate cam 210 so as to cause a corresponding diverter wheel set to transition from a first directional configuration, such as, for example, a straight directional configuration, to a second directional configuration, such as, for example, a diversion configuration. Further, the second cam element 212 may be configured to apply a force to the exemplary cam follower, as described herein, throughout at least a portion of the rotation of the conjugate cam 210 so as to cause the diverter wheel set to transition from a diversion configuration back to the straight direction configuration. In various embodiments, the rotation of a cam element 211, 212 about the central axis of the cam shaft may be defined by at least two distinct periods: an active window and a dwell window. An active window of a cam element may comprise the portion of the rotation of the conjugate cam 210 about the central axis of the cam shaft wherein the cam element applies a driving force to the cam follower sufficient to transition the diverter wheel to a particular directional configuration corresponding therewith. Alternatively, a dwell window of a cam element may comprise the remaining portion of the rotation of the conjugate cam 210 about the central axis of the cam shaft, wherein the cam element does not apply sufficient force to the cam follower so as to configure the diverter wheel set in the directional configuration associated with the cam element. In various embodiments, the total angular rotation of a cam element traveling through an active window may comprise an angle of at least substantially between 15-180 degrees (e.g., between 60-120 degrees).

As a non-limiting example, in various embodiments, a diverter apparatus may comprise conjugate cam 210 configured to control the directional configuration of a corresponding diverter wheel set, the conjugate cam 210 being configured to interact with a corresponding cam follower (not shown) in accordance with various embodiments described herein. FIG. 8A shows the conjugate cam 210 in a first angular configuration about the central axis of the cam shaft. For example, the angular configuration of the conjugate cam 210 illustrated in FIG. 8A may correspond to a diverter wheel set comprising a straight directional configuration. Further, FIG. 8B shows the conjugate cam 210 having rotated in a counterclockwise direction about the central axis of the cam shaft a rotational distance defined by angle of rotation 214. Similarly, FIG. 8C shows the conjugate cam 210 having further rotated in a counterclockwise direction about the central axis of the cam shaft a rotational distance defined by angle of rotation 214. In various embodiments, based at least in part on the configuration of the cam follower, as described herein, the rotation exhibited by the conjugate cam 210 from the angular configuration illustrated in FIG. 8A to that illustrated in FIG. 8B, defined by the angle of rotation 214, may define the active window of the first cam element 211. In such a circumstance, the angular configuration of the conjugate cam 210 illustrated in FIG. 8B may correspond to a diverter wheel set comprising a diversion configuration. Conversely, the rotation exhibited by the conjugate cam 210 and defined by the angle of rotation 214 as indicated by the exemplary angular configuration of the conjugate cam 210 in FIG. 8B, may define at least a portion of the active window of the second cam element 212. As described herein, the utilization of the plurality of cam elements of a conjugate cam in conjunction with a selective angular rotation of the cam shaft engaged with the conjugate cam enables a diverter apparatus comprising a bidirectional range of motion between two directional configurations without requiring extraneous mechanical and/or pneumatic components.

In various embodiments, the cam assembly may be configured such that the active window of the second cam element 212 may be defined by a reversed rotation of the conjugate cam 210, wherein the rotation is defined by a clockwise rotation of the conjugate cam 210 through the angle of rotation 214 illustrated in FIG. 8B, such that the conjugate cam 210 may return to the angular configuration illustrated in FIG. 8A. In such a circumstance, as described above, the angular configuration of the conjugate cam 210 may correspond to a diverter wheel set comprising a straight directional configuration.

In various embodiments, wherein the diverter apparatus comprises a plurality of diverter wheel sets, the cam assembly may be configured such that the cam shaft will continue to rotate in the counterclockwise direction until each of the diverter wheel sets comprises a diversion configuration. For example, the diverter apparatus (e.g., the plurality of conjugate cams) may be configured such that each of the diverter wheel sets may be transitioned from a straight directional configuration to a diversion configuration prior to and/or as the angle of rotation 214 of the cam shaft reaches 180°. In such an exemplary circumstance, as illustrated in FIG. 8C, the cam element 211 may be configured such that the rotation of the conjugate cam 210 between the angle of rotation illustrated in FIG. 8B and that shown in FIG. 8C may define at least a portion of the dwell window of the cam element 211, as described herein.

In various embodiments, the configuration of the peripheral profile of each cam element 211, 212 and the cam follower associated therewith (e.g., defining the active window of each of the cam elements) may be adjusted to accommodate a plurality of diverter apparatus configurations such as, for example, the number of diverter wheel sets, the predetermined sequencing of the respective diverter wheel sets, the width of the diverter conveyor surface, the number of required diverter apparatus directional configurations, and/or the like.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A diverter apparatus comprising:
   a diverter conveyor surface configured to transport an object disposed thereon to one of a plurality of adjacent conveyor locations based at least in part on a directional configuration thereof, wherein the directional configuration of the diverter conveyor surface may be configurable between at least a first directional configuration and a second directional configuration, each directional configuration corresponding to one of the plurality of adjacent conveyor locations;
   a cam follower; and
   a cam comprising a rotational range of motion about a cam shaft axis, the cam being physically engaged with the cam follower and where at least one force generated by a rotational motion of the cam causes a change of the directional configuration of the diverter conveyor surface, wherein the cam comprises a conjugate cam.

2. The diverter apparatus of claim 1, wherein the at least one force comprises a first force and a second force, wherein the diverter apparatus is configured to utilize the first force generated by a rotational motion of the cam to transition the directional configuration of the diverter conveyor surface from the first directional configuration to the second directional configuration, and wherein the diverter apparatus is further configured to utilize the second force generated by the rotational motion of the cam to transition the directional configuration of the diverter conveyor surface from the second directional configuration to the first directional configuration.

3. The diverter apparatus of claim 1, wherein the conjugate cam comprises a first cam element and a second cam element, both the first cam element and the second cam element being configured to physically engage the cam follower.

4. The diverter apparatus of claim 3, wherein the at least one force comprises a first force and a second force, wherein the first cam element is configured to transmit the first force to the cam follower, and wherein the second cam element is configured to transmit the second force to the cam follower.

5. The diverter apparatus of claim 1, wherein the cam follower is configured to rotate about a cam follower axis based at least in part on the rotational motion of the cam physically engaged therewith.

6. The diverter apparatus of claim 5, wherein the cam follower is configured to rotate both a clockwise direction and a counterclockwise direction about the cam follower axis based at least in part on the rotational motion of the cam physically engaged therewith.

7. The diverter apparatus of claim 1, further comprising a plurality of wheel sets, each wheel set comprising a plurality of wheels defining at least a portion of the diverter conveyor surface, wherein the directional configuration of each of the plurality of wheel sets is independently configurable.

8. The diverter apparatus of claim 7, further comprising a plurality of cams respectively corresponding to the plurality of wheel sets, wherein each of the plurality of wheel sets corresponds to one of the plurality of cams, and wherein each of the plurality of cams is configured to control the directional configuration of a corresponding wheel set of the plurality of wheel sets.

9. The diverter apparatus of claim 8, wherein each of the plurality of cams comprises a different angular configuration about a cam shaft engaged therewith.

10. The diverter apparatus of claim 7, wherein each of the plurality of wheel sets comprises a different directional configuration.

11. The diverter apparatus of claim 7, wherein each of the plurality of wheel sets comprises a wheel set base, each of the wheel set bases being configured to support a corresponding plurality of wheels of a corresponding wheel set of the plurality of wheel sets so as to restrict linear displacement of each of the corresponding plurality of wheels of the corresponding wheel set relative to the wheel set base.

12. The diverter apparatus of claim 11, wherein the wheel set base is selectively adjustable between a plurality of wheel set base positions, wherein the directional configuration of each of the plurality of wheel sets may be based at least in part on the wheel set base position of the corresponding wheel set base.

13. The diverter apparatus of claim 1, further comprising a wheel set drive assembly configured to drive at least one of a plurality of wheels defining at least a portion of the diverter conveyor surface so as to facilitate movement of the object along the diverter conveyor surface.

14. A method of selectively configuring a directional configuration of a diverter apparatus, the method comprising:
generating a first reconfiguration force using a first rotational motion of a cam, the first reconfiguration force being configured to transition a conveyor surface from a first directional configuration to a second directional configuration;
transitioning a conveyor surface from the first directional configuration to the second directional configuration based at least in part on the first reconfiguration force generated using the first rotational motion of the cam;
generating a second reconfiguration force using a second rotational motion of the cam, the second reconfiguration force being configured to transition the conveyor surface from the second directional configuration to the first directional configuration; and
transitioning the conveyor surface from the second directional configuration to the first directional configuration based at least in part on the second reconfiguration force generated using the second rotational motion of the cam.

15. The method of claim 14, wherein the cam comprises a conjugate cam.

16. The method of claim 15, wherein the conjugate cam comprises a first cam element and a second cam element, both the first cam element and the second cam element being configured to physically engage a cam follower.

17. The method of claim 14, wherein the conveyor surface comprises a plurality of wheel sets, each wheel set comprising a plurality of wheels defining at least a portion of the conveyor surface, wherein the directional configuration of each of the plurality of wheel sets is independently configurable.

18. The method of claim 17, further comprising selectively reconfiguring the directional configuration of a first wheel set of the plurality of wheel sets of the conveyor surface based at least in part on a determination that the first wheel set is physically engaged with at least a portion of an object disposed upon the conveyor surface.

19. The method of claim 17, wherein each of the plurality of wheel sets comprises a wheel set base, and wherein the method further comprises selectively adjusting the wheel set base of a corresponding wheel set of the plurality of wheel sets between a plurality of wheel set base positions, wherein the wheel set base is configured to support the plurality of wheels of the corresponding wheel set so as to restrict linear displacement of each of the plurality of wheels of the corresponding wheel set relative to the wheel set base, and wherein the directional configuration of the corresponding wheel set of the plurality of wheel sets may be based at least in part on a wheel set base position of the wheel set base.

* * * * *